United States Patent
Dettinger et al.

(10) Patent No.: US 6,928,431 B2
(45) Date of Patent: Aug. 9, 2005

(54) DYNAMIC END USER SPECIFIC CUSTOMIZATION OF AN APPLICATION'S PHYSICAL DATA LAYER THROUGH A DATA REPOSITORY ABSTRACTION LAYER

(75) Inventors: Richard Dean Dettinger, Rochester, MN (US); Richard Joseph Stevens, Mantorville, MN (US)

(73) Assignee: International Business Machines Corporation, Armonk, NY (US)

(*) Notice: Subject to any disclaimer, the term of this patent is extended or adjusted under 35 U.S.C. 154(b) by 456 days.

(21) Appl. No.: 10/132,228

(22) Filed: Apr. 25, 2002

(65) Prior Publication Data

US 2003/0208486 A1 Nov. 6, 2003

(51) Int. Cl.[7] .............................................. G06F 17/30
(52) U.S. Cl. .............................................. 707/3; 707/9
(58) Field of Search ............................ 707/1–4, 9, 10, 707/103 R, 103 Y

(56) References Cited

U.S. PATENT DOCUMENTS

| | | | | |
|---|---|---|---|---|
| 5,369,778 A | * | 11/1994 | San Soucie et al. | .... 707/103 R |
| 5,918,232 A | * | 6/1999 | Pouschine et al. | ...... 707/103 R |
| 6,609,123 B1 | * | 8/2003 | Cazemier et al. | .............. 707/4 |
| 6,725,227 B1 | | 4/2004 | Li | |
| 2001/0016843 A1 | * | 8/2001 | Olson et al. | .................... 707/3 |
| 2002/0091702 A1 | * | 7/2002 | Mullins | ...................... 707/100 |
| 2002/0123984 A1 | * | 9/2002 | Prakash | ......................... 707/1 |
| 2003/0212666 A1 | * | 11/2003 | Basu et al. | ..................... 707/3 |
| 2004/0172305 A1 | * | 9/2004 | Soerensen et al. | ............. 705/3 |

OTHER PUBLICATIONS

Lerm et al, "Cooperative access to relational and object–oriented federated databases", IEEE 1993, pp. 222–227.*
IBM U.S. Appl. No. 10/083,075, filed on Feb. 26, 2002, "Improved Application Portability and Extensibility Through Database Schema and Query Abstraction" (ROC920020044US1).
IBM U.S. Appl. No. 10/131,984, filed on Apr. 25, 2002, "Remote Data Access and Integration of Distributed data Sources Through Data Schema and Query Abstraction" (ROC920020089US1).
IBM U.S. Appl. No. 10/153,977 filed, May 23, 2002, "Dynamic Content Generation /Regeneration for a Database Schema Abstraction" (ROC920020096US1)

* cited by examiner

Primary Examiner—Uyen Le
(74) Attorney, Agent, or Firm—Moser, Patterson & Sheridan, LLP

(57) ABSTRACT

A system, method and article of manufacture are provided for accessing data independent of the particular manner in which the data is physically represented. In one embodiment, a plurality of data repository abstractions provide different logical views of the same underlying data repository. The plurality of data repository abstractions may each be associated with different users, thereby exposing a different set of data to each user. A runtime component performs translation of abstract queries into a form that can be used against a particular physical data representation.

27 Claims, 11 Drawing Sheets

DYNAMIC END USER SPECIFIC CUSTOMIZATION OF AN APPLICATION'S PHYSICAL DATA LAYER THROUGH A DATA REPOSITORY ABSTRACTION LAYER

BACKGROUND OF THE INVENTION

1. Field of the Invention

The present invention generally relates to data processing and more particularly to accessing data independent of the particular manner in which the data is physically represented.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In the case of EJB, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application build and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

Another shortcoming of the prior art, is the manner in which information can be presented to the user. A number of software solutions support the use of user-defined queries, in which the user is provided with a tool to construct a query that meets the user's specific data selection requirements. In an SQL-based system, the user is given a list of underlying database tables and columns to choose from when building a query. The user must decide which tables and columns to access based on the naming convention used by the database administrator. This approach does not provide an effective way to subset the set of information presented to the user. As a result, even nonessential content is revealed to the user.

Further, existing database environments do not effectively accommodate multiple users desiring to access different portions of the same physical data simultaneously. Typically, such simultaneous access is accomplished by each user using a separate application. Each application is written to expose the desired data to the respective users. Accordingly, substantial overhead in application development results in today's database environments.

Therefore, there is a need for an improved and more flexible method for accessing data which is not limited to the particular manner in which the underlying physical data is represented and which preferably avoids overhead in application development associated with the prior art.

SUMMARY OF THE INVENTION

The present invention generally is directed to a method, system and article of manufacture for accessing data independent of the particular manner in which the data is physically represented and for exposing the data differently using the same application. In one embodiment, a plurality of data repository abstractions provide different logical views of the same underlying data repository. The plurality of data repository abstractions may each be associated with different users, thereby exposing a different set of data to each user. A runtime component performs translation of abstract queries into a form that can be used against a particular physical data representation.

One embodiment provides a method of providing access to data having a particular physical data representation. The method comprises providing a query specification comprising a plurality of logical fields for defining abstract queries; providing a first set of mapping rules which map at least a first portion of the plurality of logical fields to a first plurality of physical entities of the data; and providing a second set of mapping rules which map at least a second portion of the plurality of logical fields to a second plurality of physical entities of the data.

Another method of providing access to data having a particular physical data representation comprises providing an application defining a query specification comprising a plurality of logical fields for defining abstract queries; and providing a plurality of user profiles each defining an association with different sets of mapping rules each of which map at least a portion of the plurality of logical fields to physical entities of the data.

Yet another method of accessing data having a particular physical data representation comprises issuing, by a first user, a first abstract query to an application, wherein the first abstract query is defined according to a first plurality of logical fields and, in response to the first abstract query, accessing a first set of mapping rules having a defined association with the first user. In response to a second user issuing a second abstract query to the application, wherein the second abstract query is defined according to a second plurality of logical fields. In response to the second abstract query, a second set of mapping rules having a defined association with the second user is accessed. Each of the first and second abstract queries are transformed into queries consistent with the particular physical data representation according to respective mapping rules which map the logical fields to physical entities of the data.

Yet another embodiment provides a computer-readable medium containing a database access environment which provides access to data having a particular physical data representation. The database access environment comprises an application comprising a query specification, the query specification comprising a plurality of logical fields for defining abstract queries; and a plurality of mapping rules sets which map the plurality of logical fields to physical entities of the data. At least two of the plurality of mapping rules sets map the plurality of logical fields to different sets of the physical entities of the data and are uniquely associated with at least one of two different requesting entities selected from one of two different users, two different groups of users, and a group of users and a user.

Still another embodiment provides a computer-readable medium containing a program which, when executed by a processor, performs an operation of accessing data having a particular physical data representation. The operation comprises receiving a plurality of abstract queries issued by a plurality of users according to a query specification of an application; wherein the query specification provides a definition for the abstract query according to logical fields; and transforming the abstract query into a query consistent with the particular physical data representation according to a plurality of data repository abstraction components which map the logical fields to physical entities of the data. A different data repository abstraction component is associated with at least two of the users using the application.

Still another embodiment provides a computer comprising a memory containing at least (i) an application comprising a query specification providing a definition for an abstract query according to logical fields, (ii) a plurality of data repository abstraction components which map the logical fields to physical entities of data, wherein at least a portion of the data repository abstraction components have a programmatically defined association with different users, and (iii) a runtime component for transforming the abstract query into a query consistent with the physical entities of data according to the data repository abstraction components.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
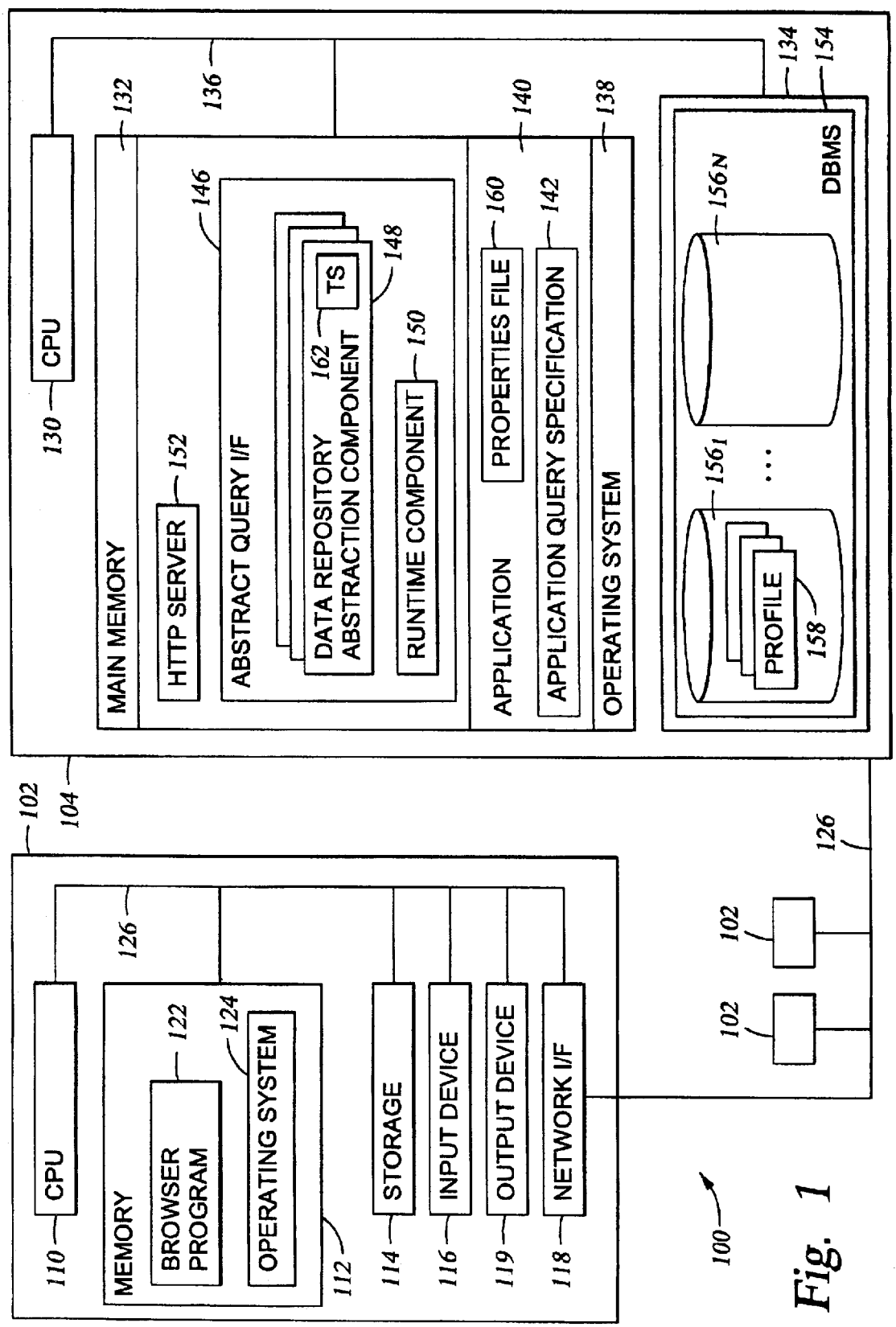
FIG. 1 is one embodiment of a computer system utilized in accordance with the invention.

The present invention generally is directed to a system, method and article of manufacture for accessing data independent of the particular manner in which the data is physically represented. In one embodiment, a data repository abstraction layer provides a logical view of the underlying data repository that is independent of the particular manner in which the data is physically represented. A query abstraction layer is also provided and is based on the data repository abstraction layer. A runtime component performs translation of an abstract query into a form that can be used against a particular physical data representation. In one embodiment, the data repository abstraction layer comprises multiple data repository abstraction components/instances which coexist (and, in some embodiments, cooperate) within a single application space. The provision of multiple instances of data repository abstractions allows different sets of data to be exposed to different users. Further, one embodiment provides for dynamic instantiation of new data repository abstraction components allowing for on-the-fly changes to be made and for multiple dynamic users to customize their respective data abstraction component.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1 \ldots 156_N$, collectively referred to as database(s) 156). Illustratively, the databases 156 are shown as part of a database management system (DBMS) in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which first transforms the abstract queries into a form consistent with the physical representation of the data contained in the DBMS 154. The application query specification 142 and the abstract query interface 146 are further described with reference to FIGS. 2A–B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156 invoke an application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Logical/Runtime View of Environment

Figure 2A:
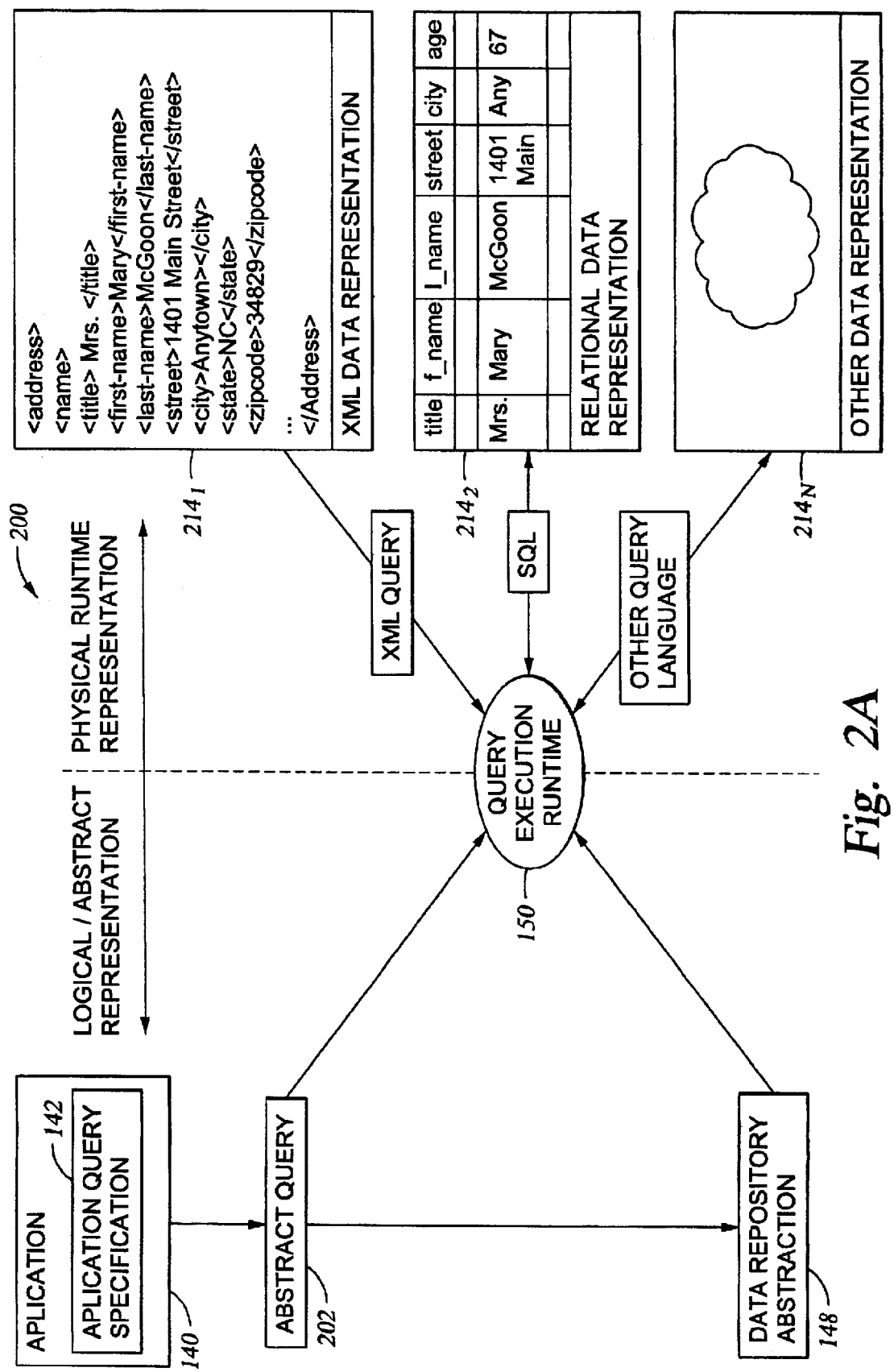
FIGS. 2A and 2B are relational views of software components of one embodiment of the invention.
Figure 2B:
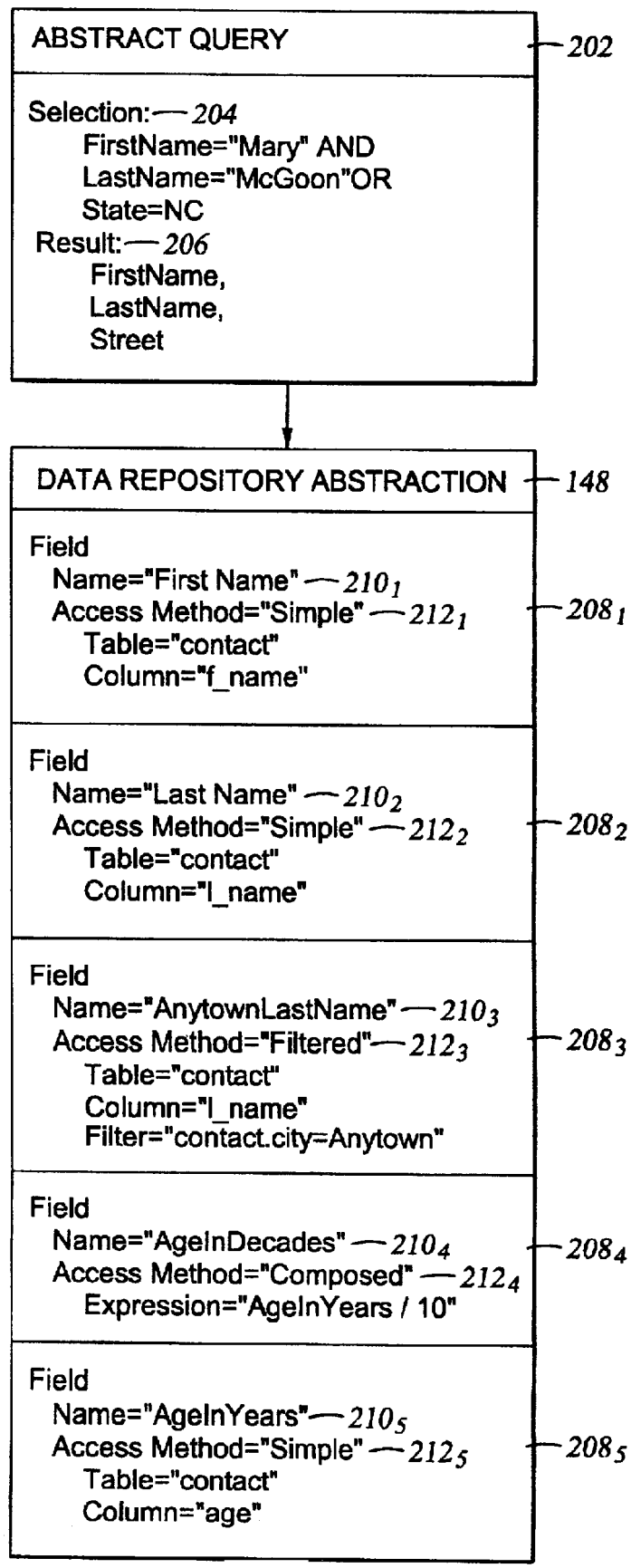

FIGS. 2A–B show an illustrative relational view 200 of components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the DBMS 154, thereby allowing queries to be formed that are loosely coupled to the underlying data representation.

In general, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $214_2$, $212_3$, $212_4$, $212_5$ (collectively, access method 212). The access methods associate (i.e., map) the logical field names to a particular physical data representation $214_1$, $214_2$ . . . $214_N$ in a database (e.g., one of the databases 156). By way of illustration, two data representations are shown, an XML data representation $214_1$ and a relational data representation $214_2$. However, the physical data representation $214_N$ indicates that any other data representation, known or unknown, is contemplated.

In one embodiment, a single data repository abstraction component 148 contains field specifications (with associated access methods) for two or more physical data representations 214. In an alternative embodiment, a different single data repository abstraction component 148 is provided for each separate physical data representation 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148. The latter embodiment will be described in more detail below.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2 are representative of logical fields mapped to data represented in the relational data representation $214_2$. However, other instances of the data repository extraction component 148 map logical fields to other physical data representations, such as XML.

An illustrative abstract query corresponding to the abstract query 202 shown in FIG. 2 is shown in Table 1 below. By way of illustration, the Data Repository Abstraction 148 is defined using XML. However, any other language may be used to advantage.

TABLE I

QUERY EXAMPLE

```
001  <?xml version="1.0"?>
002  <?--Query string representation: (FirstName = "Mary" AND
003  LastName = "McGoon") OR State = "NC"-->
004  <QueryAbstraction>
005    <Selection>
006      <Condition internalID="4">
007        <Condition field="FirstName" operator="EQ"
008  value="Mary" internalID="1"/>
009        <Condition field="LastName" operator="EQ"
010  value="McGoon" internalID="3"
     relOperator="AND"></Condition>
011      </Condition>
012      <Condition field="State" operator="EQ" value="NC"
013  internalID="2" relOperator="OR"></Condition>
014    </Selection>
015    <Results>
016      <Field name="FirstName"/>
017      <Field name="LastName"/>
018      <Field name="State"/>
019    </Results>
020  </QueryAbstraction>
```

Illustratively, the abstract query shown in Table 1 includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative abstract query corresponding to the Data Repository Abstraction 148 shown in FIG. 2 is shown in Table II below. By way of illustration, the Data Repository Abstraction 148 is defined using XML. However, any other language may be used to advantage.

TABLE II

DATA REPOSITORY ABSTRACTION EXAMPLE

```
001  <?xml version="1.0"?>
002  <DataRepository>
003    <Category name="Demographic">
004      <Field queryable="Yes" name="FirstName" displayable="Yes">
005        <AccessMethod>
006          <Simple columnName="f_name" tableName="contact"></Simple>
007        </AccessMethod>
008        <Type baseType="char"></Type>
009      </Field>
010      <Field queryable="Yes" name="LastName" displayable="Yes">
011        <AccessMethod>
012          <Simple columnName="l_name" tableName="contact"></Simple>
```

TABLE II-continued

DATA REPOSITORY ABSTRACTION EXAMPLE

```
013         </AccessMethod>
014         <Type baseType="char"></Type>
015       </Field>
016       <Field queryable="Yes" name="State" displayable="Yes">
017         <AccessMethod>
018           <Simple columnName="state" tableName="contact"></Simple>
019         </AccessMethod>
020         <Type baseType="char"></Type>
021       </Field>
022     </Category>
023   </DataRepository>
```

Figure 3:
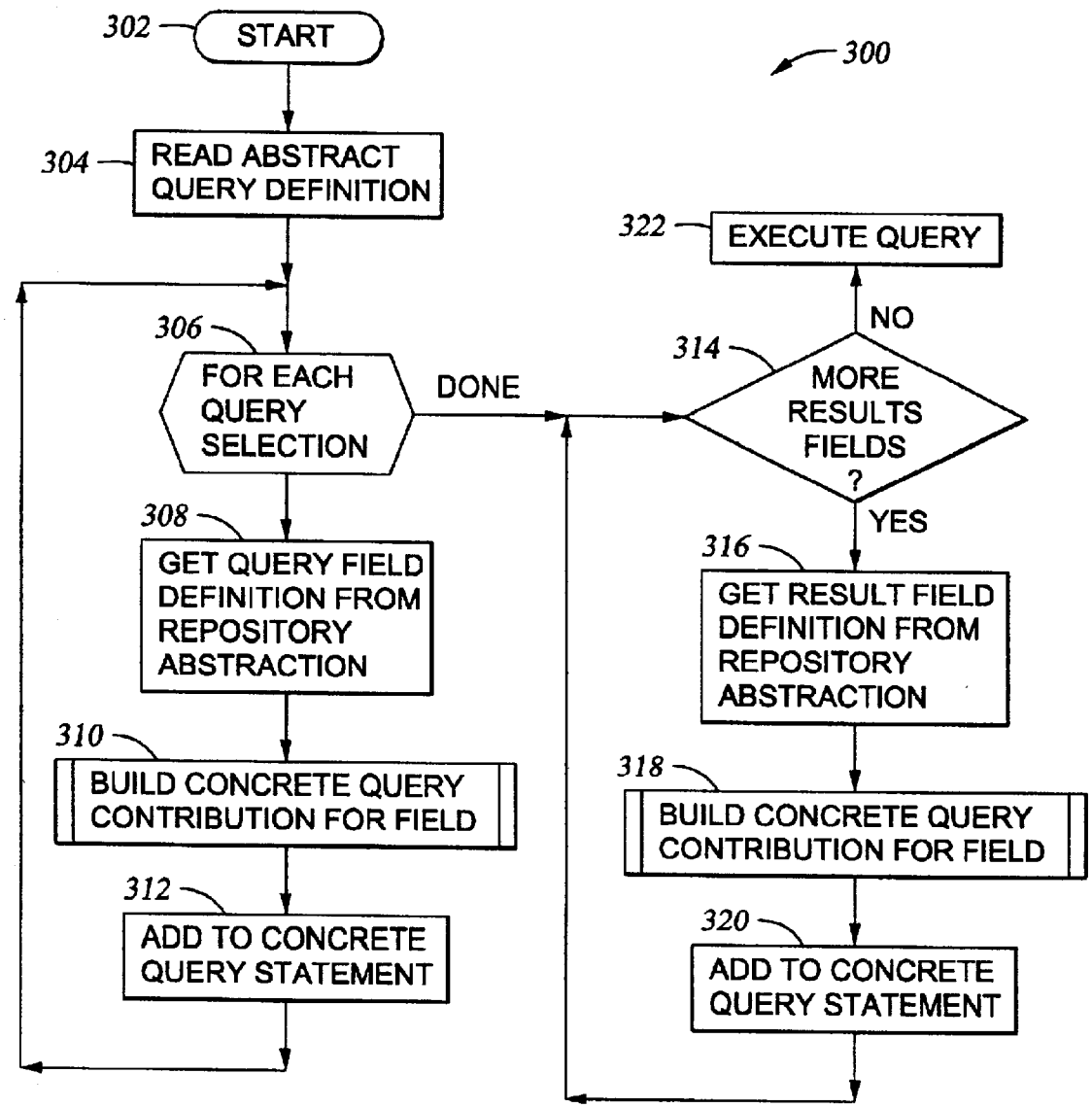
FIG. 3 is a flow chart illustrating the operation of a runtime component.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the DBMS 154 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
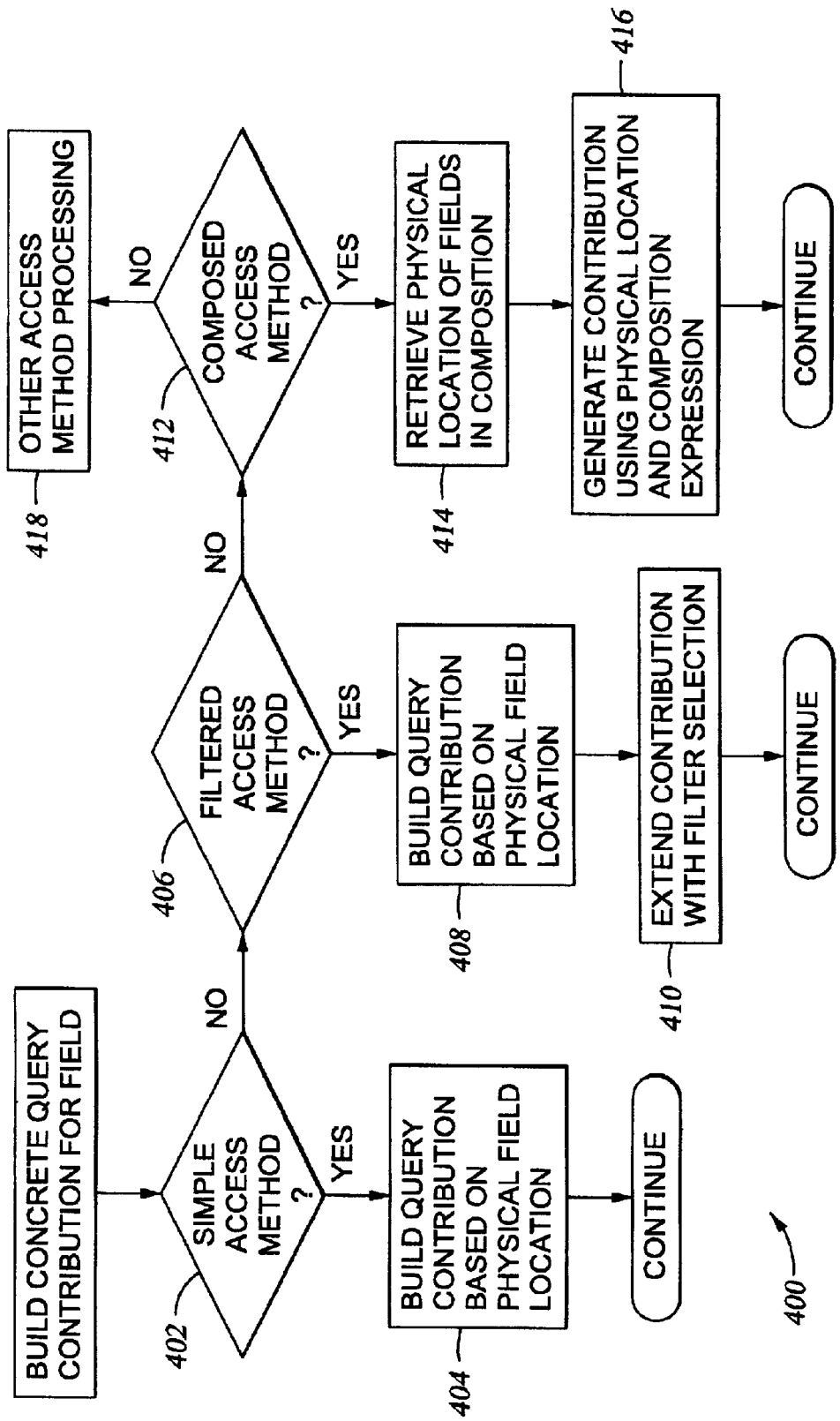
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

In various embodiments, numerous advantages over the prior art are provided. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

Figure 5:
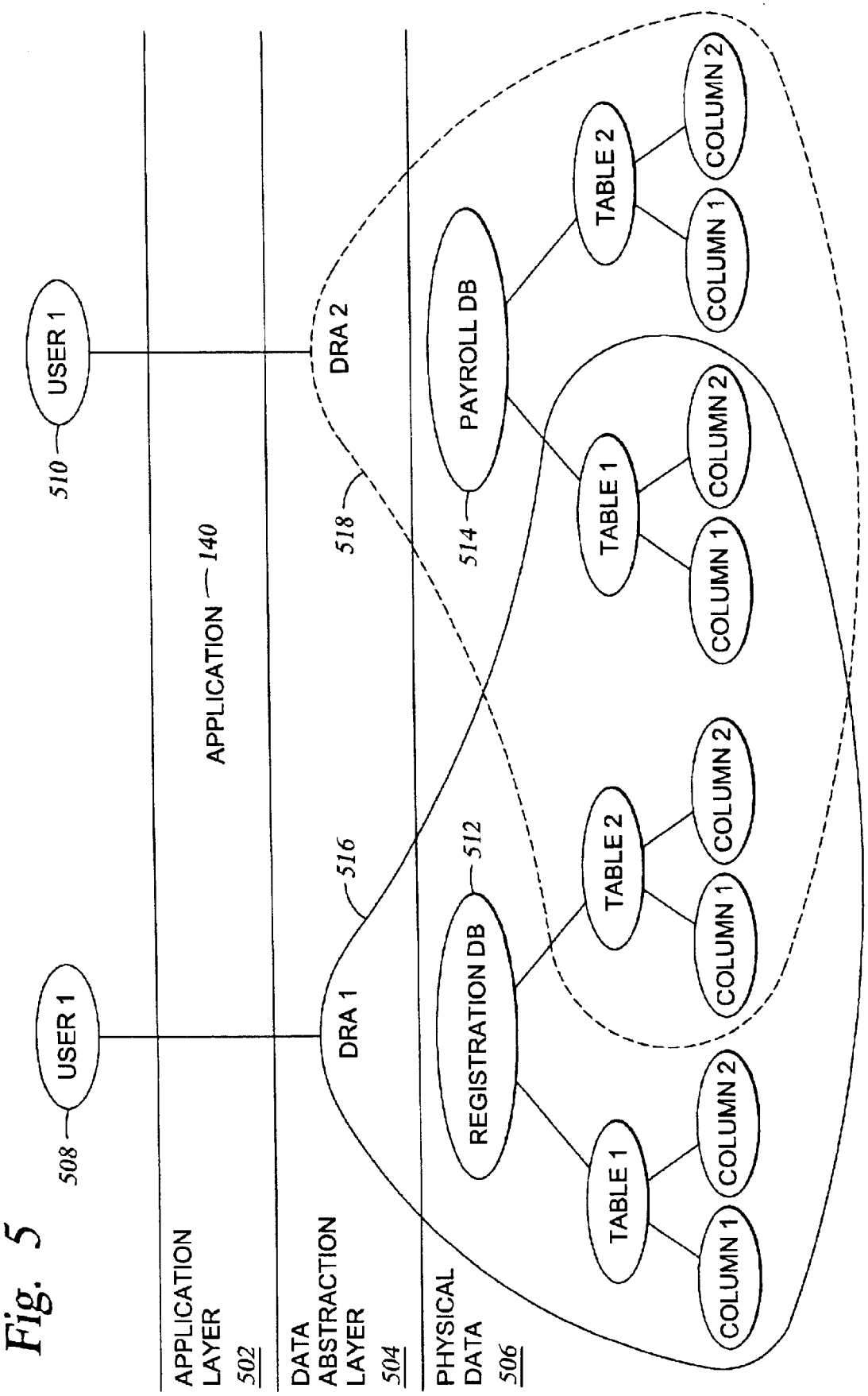
FIG. 5 illustrates one embodiment in which multiple instances of a data repository abstraction component coexist in a single application space.

As noted above, one embodiment provides multiple instances of the data repository abstraction components 148 which coexist in a single application space. One embodiment illustrating such an environment is shown in FIG. 5. The environment 500 generally comprises an application layer 502 (defined by the application 140), a data abstraction layer 504, and a physical data layer 506. The environment 500 shows two users 508, 510 accessing the physical data layer 506 via the application layer 504. Accordingly, the users 508, 510 are accessing the same physical data layer 506 through a common application layer 504. However, the data being exposed to the respective users 508, 510 is not the same. Rather, each user is exposed to selected portions of the physical data layer 506 according to the definition of the data abstraction layer 504. More particularly, the data abstraction layer 504 illustratively includes two data repository abstraction components, DRA1 516 and DRA2 518, which define the data that will be exposed to the users 508, 510, respectively, via the application layer 502. In the present example, the first data repository abstraction (DRA1 516) exposes all of a first database 512 (registration database) and TABLE 1 of a second database 514 (payroll database) while the second data repository abstraction (DRA2 518) exposes all of the second database 514 and TABLE 1 of the first database 512. It should be noted that the particular data exposed by the respective data repository abstraction components is merely illustrative. More generally, any portion of the databases 512, 14 may be exposed, as well as any other databases of the data abstraction layer 504. By way of illustration the environment 500 shows two users (508, 510), however, more generally any number of users may be accessing the data of the physical data layer 506.

Figure 6:
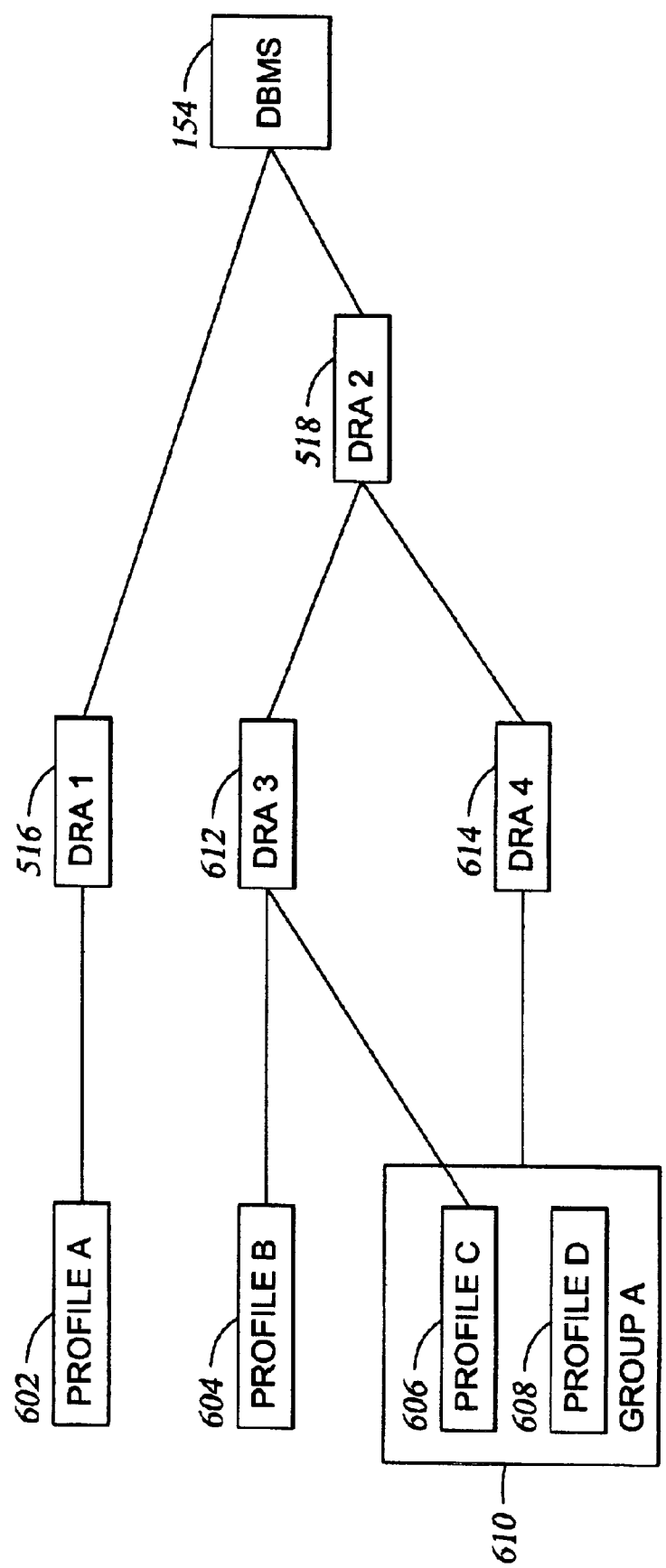
FIG. 6 illustrates an environment in which users have a profile each of which is associated with a data repository abstraction component, either directly or by virtue of membership with a group.

In one embodiment, each user has associated profile 158 (shown in FIG. 1). Each profile includes a user ID and determines a particular user's authority on the system. Further, in some cases a profile is associated with a particular data repository abstraction components 148. These aspects are illustrated in FIG. 6. For example, Profile A 602 and Profile B 604 are profiles for the first user 508 and the second user 510 shown in FIG. 5. As such, Profile A defines an association with the first data repository abstraction component DRA1 516 and Profile B 604 defines an association with the second data repository abstraction component DRA2 518. In one embodiment, individual profiles define members of a group. For example, Profile C 606 and Profile D 608 are members of a Group A 610. In some cases, the group itself defines an association with a data repository extraction component. For example, Group A 610 defines an association with a fourth data repository extraction component, DRA4 614. In this way, members of a group inherit a data repository abstraction component from the group definition, rather than through their own respective profiles. However, in one embodiment, members of a group override the data repository abstraction component defined by their group, as is exemplified by Profile C which defines an association to a third data repository abstraction DRA3 612.

FIG. 6 also illustrates an embodiment in which data repository abstraction components reference one another. Specifically, the second data repository abstraction component DRA2 518 is a parent with respect to the third data repository abstraction component DRA3 612 (a child). In this relationship, the third data repository abstraction component DRA3 612 inherits at least a portion of the definition of the second data repository abstraction component DRA2 518. The third data repository abstraction component DRA3 612 may also override portions of the second data repository abstraction component DRA2 518 and/or include additional definitions not found in the second data repository extraction component DRA2 518. These aspects are further described with reference to FIG. 7.

Figure 7:
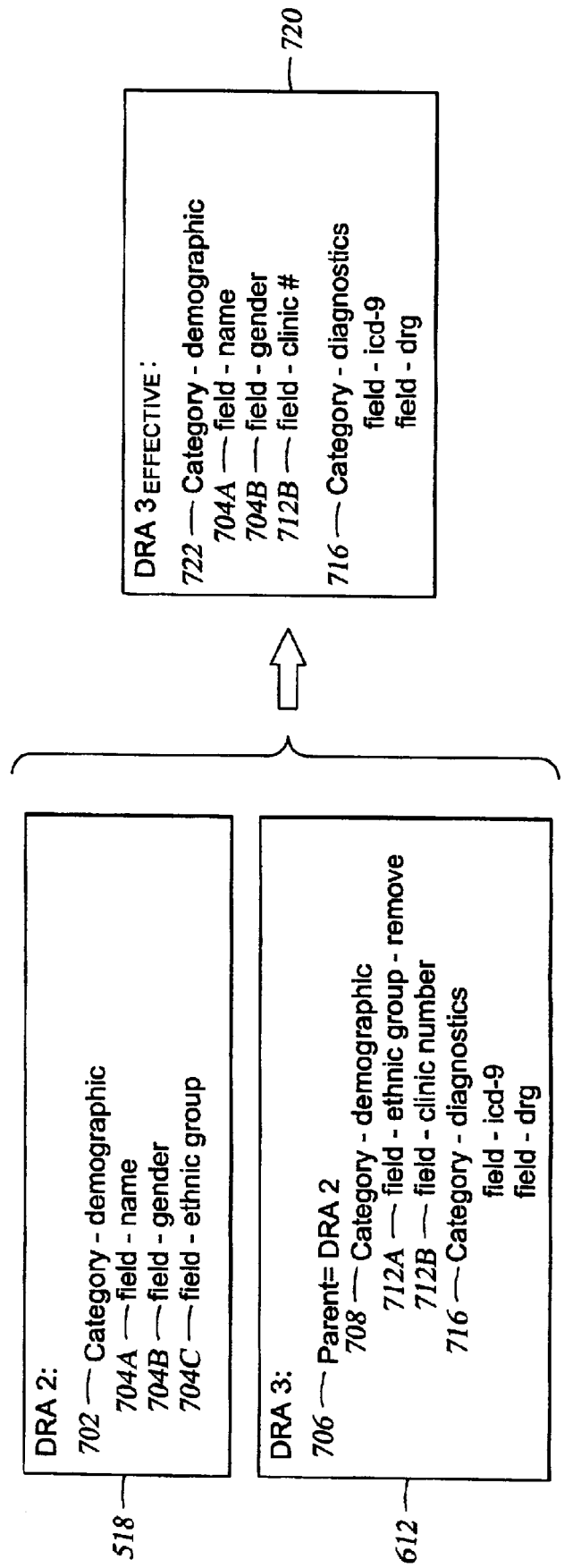
FIG. 7 illustrates inheritance of aspects of one data repository abstraction component by another data repository abstraction component.

FIG. 7 shows an illustrative embodiment of the second data repository abstraction component DRA2 518 and the third data repository abstraction component DRA3 612. The second data repository abstraction component 518 defines a category 702 named "demographic" which includes three fields 704A–C: "name", "gender" and "ethnic group", respectively. The third data repository abstraction component 612 includes a parent attribute 706. The parent attribute 706 operates as a reference to the second data repository abstraction component 518, whereby the fields of any common category (with respect to the second data repository abstraction component 518) are inherited by the third data repository abstraction component 612. For example, the third data repository abstraction component 612 includes a category 708 named "demographic". As such, the third data repository abstraction component 612 inherits each of the fields 704 from the second data repository extraction component 518. However, in this example, the category 708 of the third data repository abstraction component 612 is configured with a remove attribute 710 associated with an ethnic group field 712A corresponding to the ethnic group field of the second data repository abstraction component 518. The remove attribute 710 operates to remove or override the inheritance of the specified field from the parent data repository abstraction component, in this case the ethnic group field. Further, the child category 708 may also include additional fields that supplement the fields 704A–B of the parent category 702. In the present example, the child category 708 includes and additional clinic number field 712B. Of course, the child data repository abstraction component 612 may also define its own unique categories. For example, the data repository abstraction component 612 defines a diagnostics category 716 in addition to the category 708. FIG. 7 shows the resulting "effective" data repository abstraction component DRA3$_{effective}$ 720. That is, the effective data repository abstraction component 720 is not an actual existing DRA but rather a representation of the effective category and field definitions of the data repository abstraction component 612. Specifically, the effective data repository abstraction component 720 indicates that the data repository abstraction component 612 includes a category 722 named "demographic" which includes two fields 704A–B inherited from the parent DRA2 518 and the additional clinic number field 712B. Note that the ethnic group field 704C is not present, as it has been removed by the remove attribute 710. The effective data repository abstraction component 720 also indicates that the data repository abstraction component 612 includes the category 716.

The foregoing describes embodiments in which data repository abstraction components 148 inherit from one another and may be configured to selectively remove some inherited columns. However, embodiments of the invention are contemplated in which other attributes are used to manipulate aspects of a data repository abstraction component. For example, selected inherited columns of one data repository abstraction component may be modified (e.g., by use of a modify attribute) for use by another data repository abstraction component. By way of example, assume that the gender field 704B of DRA2 518 takes as valid values "male" and "female" for purposes of end-user usability, while the underlying physical database supports the values "M" and "F". Accordingly, the runtime component 150 (i.e., a query builder of the runtime component 250) can take what the DRA 518 gets as input ("male" or "female") and build queries consistent with the underlying physical database values ("M" and "F"). Another data repository abstraction component can now be defined to extend DRA 518 and have a gender column that defines the mapping of values for the gender column as 1 and 0 to accommodate users of another work environment. Again, the runtime component 150 will take the 1 and 0 and convert them into values consistent with the underlying physical database (i.e., "M" and "F"). In one aspect, this approach merely illustrates that a child data repository abstraction component which defines a value inherited from a parent data repository abstraction component, and for which no remove attribute for that column exists, will use its own implementation over that of its parent.

In one aspect, the foregoing embodiment ensures that users cannot make unilateral decisions based on sensitive information such as ethnic origin or gender. By preventing access to selected information of the physical data layer (either by using the remove attribute in the case of inherited/referenced categories of a child data repository abstraction or by definition of the non-inherited categories of the data repository abstraction components) undesired issues can be avoided. For example, the user of the second data repository abstraction component 518 is given access to the ethnic group field 704C, while the user of the third data repository abstraction component 612 is not.

Figure 8:
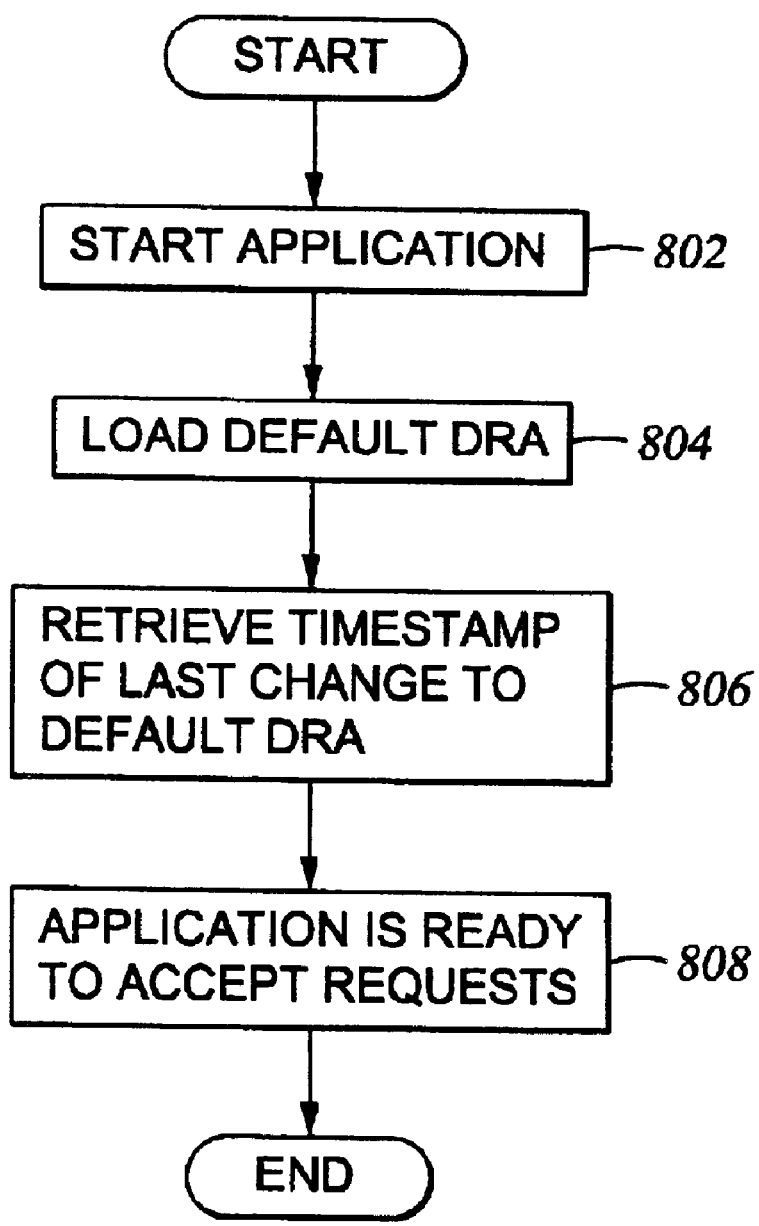
FIG. 8 is a flow chart illustrating application start-up.

Referring now to FIG. 8, a method 800 is shown illustrating an initial program load of the application 140. At step 802, execution of the application 140 is initiated (e.g., by an administrator). At step 804, a default data repository abstraction component is loaded. In one embodiment, the default data repository abstraction component is specified by properties file 160 (shown in FIG. 1) of the application 140. Specifying a default data repository abstraction component ensures that a data repository abstraction component is always available even if one is not specified by a profile for a user or a group. Once the default data repository abstraction component is loaded, the associated timestamp for the default data repository abstraction component is loaded (step 806). As shown in FIG. 1, each data repository abstraction component 148 as an associated timestamp 162. The associated timestamps indicate when the respective data repository abstraction component was last modified. The application 140 is now ready to begin accepting requests.

Figure 9:
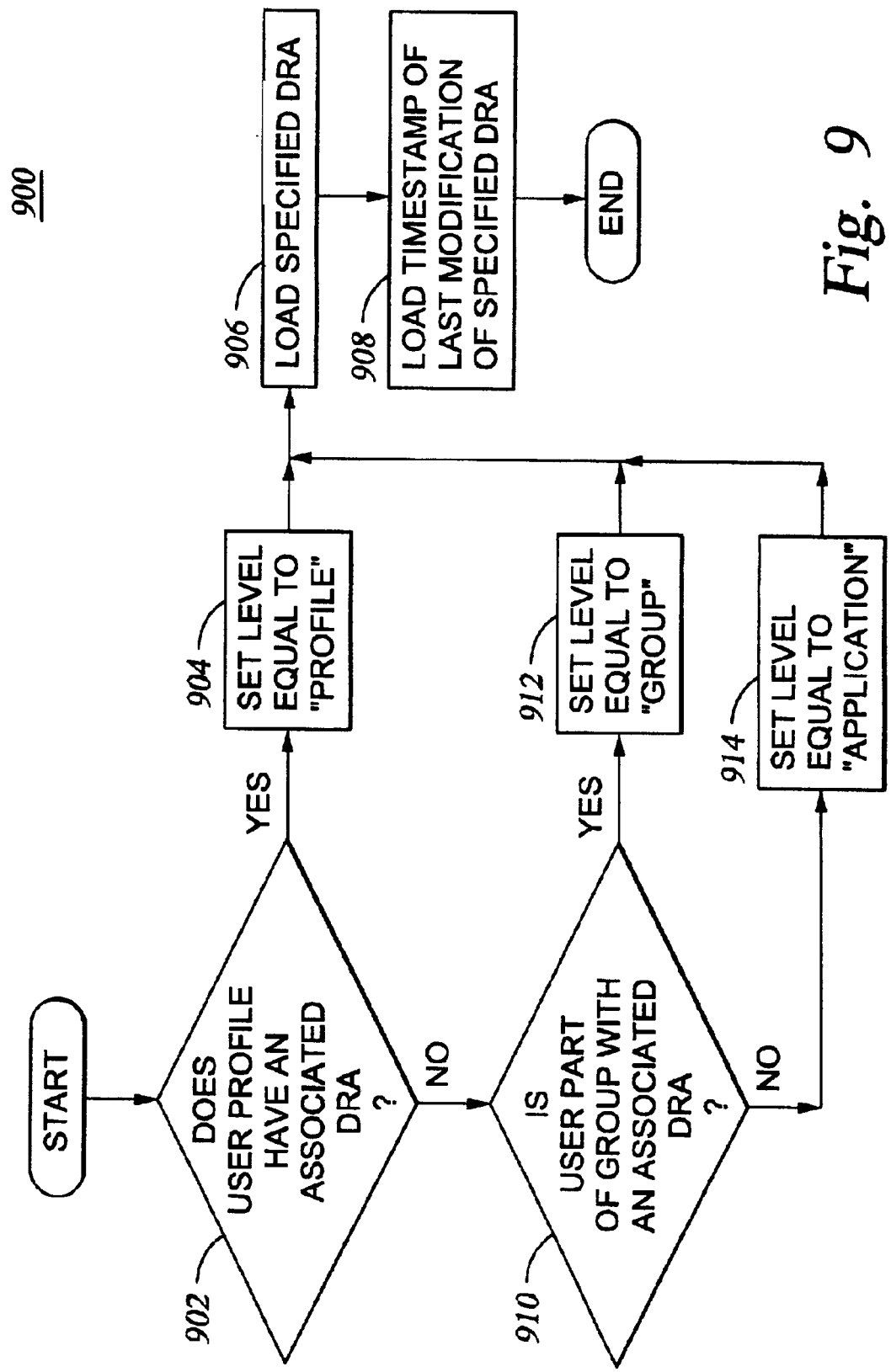
FIG. 9 is a flow chart illustrating selection of a data repository abstraction component and an associated level/status indicative of the origin of the relationship between the data repository abstraction component and a user.

When a user connects to the application 140 (i.e., when the user issues a query to the application), it is necessary to determine which data repository abstraction component is needed for the user. In one embodiment, a level/status and the time of last modification (according to the associated timestamp) are also determined for each data repository abstraction component loaded for a given user. One embodiment of a method 900 for handling these aspects is described with reference to FIG. 9. In one embodiment, the method 900 is representative of a function of an application programming interface (API) for a data repository abstraction component 148. Upon issuance of a request to the application 140, the method 900 determines (step 902) whether the profile for the particular user issuing the request specifies a data repository abstraction component 148. If so, a level/status for the specified data repository abstraction component is set equal to "profile" (step 904). The level/status is any mechanism for tracking now a particular data repository abstraction component was specified. In one embodiment, the level/status may simply be a variable value. A copy of the specified data repository abstraction component is then loaded (step 906) and the associated timestamp of the specified data repository abstraction component is loaded into memory (step 908). If the profile for the particular user issuing the request does not specify a data repository abstraction component (step 902), the method 900 determines whether the user is part of a group with an associated data repository abstraction component (step 910). If so, the level/status is set equal to "group" (step 912). A copy of the specified data repository abstraction component is then loaded (step 906) and the associated timestamp of the specified data repository abstraction component is loaded into memory (step 908). If the user is not part of a group with an associated data repository abstraction component (step 910), the level/status is set equal to "application" (step 914). A copy of the default data repository abstraction component is then loaded (step 906) and the associated timestamp of the default data repository abstraction component is loaded into memory (step 908).

Figure 10:
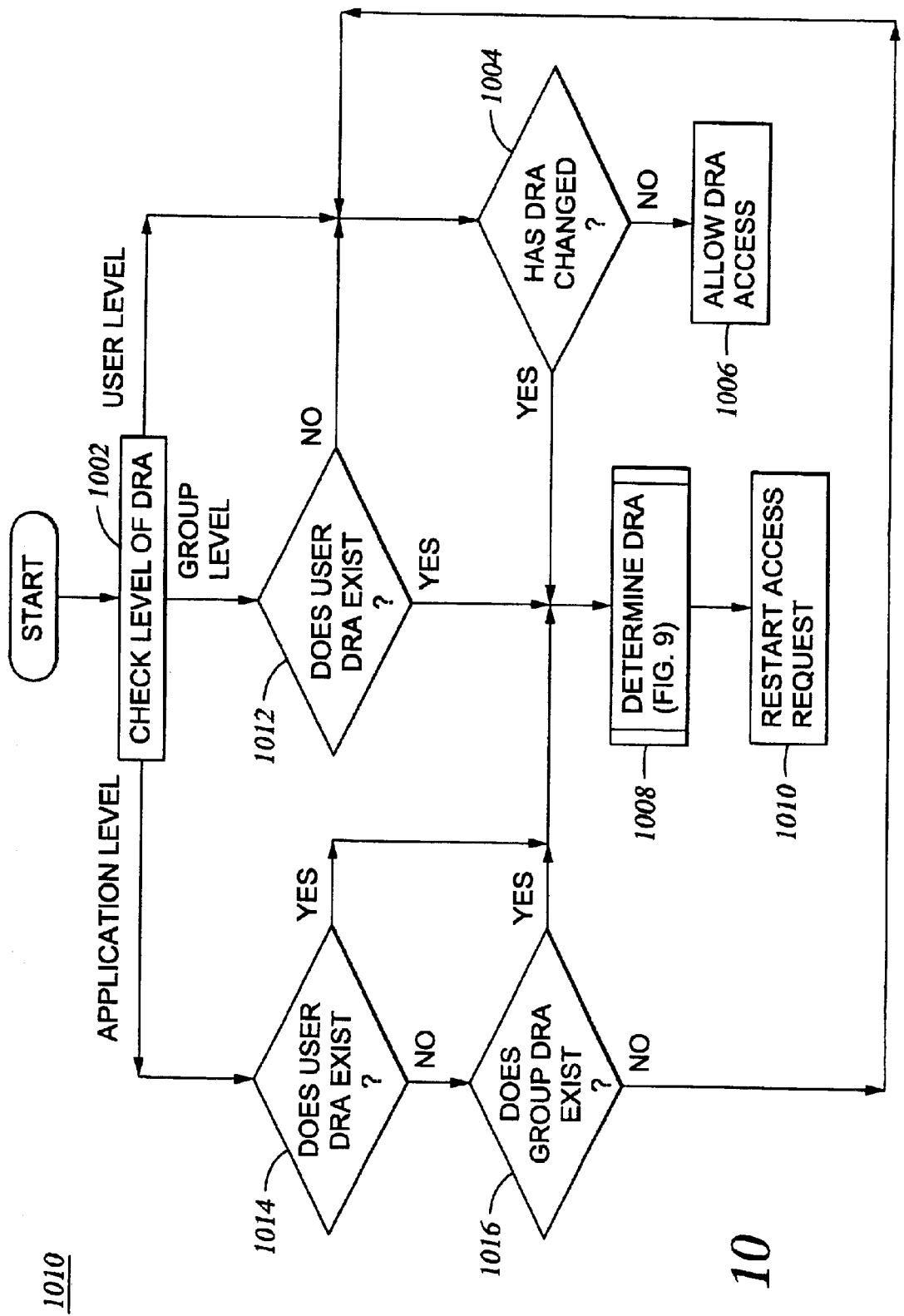
FIG. 10 is a flow chart illustrating how access requests are handled and the dynamic updating of data repository abstraction components.

In a multi-user environment, the method 900 will be performed for each user. As a result, numerous instances of data repository abstraction components (some of which may be the same) may exist at any given time. Further, in some cases, a data repository abstraction component 148 may be changed (e.g., by modifying a file associated with the data repository extraction component), added or removed. The latter events (change, modify and add) may occur whether in a single-user or multi-user environment. For example, in operation, a user may initially be working at the application level/status (i.e., the user is working with their own copy of the default data repository abstraction component). Assume that the user then modifies their copy of the default data repository abstraction component and associates that copy with their profile 158. Subsequent requests by that user should now access the data repository abstraction component associated with the user's profile 158. Accordingly, a mechanism is needed whereby these events are detected and handled appropriately. One such mechanism is illustrated by a method 1000 shown in FIG. 10. In particular, the method 1000 illustrates an algorithm which may be implemented when a particular data repository abstraction component is accessed. In one embodiment, the method 1000 is representative of a function of an application programming interface (API) for a data repository abstraction component 148. At step 1002, the level/status of the data repository abstraction component being accessed is checked. As described above with reference to FIG. 9, the level/status is one of "user", "group" and "application". If the level/status is "user", the method 1000 determines whether the data repository abstraction component being accessed has changed (step 1004). This is accomplished by comparing the timestamp of the last modification to the data repository abstraction component being accessed (which was loaded into memory at step 908 of the method 900) with the current timestamp of the data repository abstraction component being accessed. If the data repository abstraction component being accessed has not changed, the access is allowed to proceed (step 1006). Otherwise, the method 900 is again performed (step 1008), after which the access request is re-initiated (1010).

If the level/status of the data repository abstraction component being accessed is set to "group" (as determined at step 1002), the presence of a data repository abstraction component at the next highest levels/statuses (for the present user) are checked (step 1012). In the present embodiment, only the "user" level/status is higher than the "group" level/status. Accordingly, if a user level data repository abstraction component does not exist for the particular user, the method 1000 determines whether the data repository abstraction component being accessed has changed (step 1004), i.e., by comparison of timestamps as described above. If the data repository abstraction component being accessed has not changed, the access is allowed to proceed (step 1006). Otherwise, the method 900 is again performed (step 1008), after which the access request is re-initiated (1010).

If the level/status of the data repository abstraction component being accessed is set to "application" (as determined at step 1002), the presence of a data repository abstraction component at the next highest levels/statuses (for the present user) are checked (step 1012). In the present embodiment, the "user" level/status and the "group" level/status are higher than the "application" level/status. Accordingly, the method 100 first determines whether a user level data repository abstraction component exists (step 1014) and, if not, then determines whether a group level data repository abstraction component exists (step 1016). If either a user level or group level data repository abstraction component exists for the present user, processing proceeds to step 1008 where the method 900 is again performed to determine the appropriate data repository abstraction component to be used, after which the access request is re-initiated (1010). If neither any user level or group level data repository abstraction component exists for the present user, processing proceeds to step 1004 to determine whether the current application level data repository abstraction component being accessed has changed (step 1004), i.e., by comparison of timestamps as described above. If the data repository abstraction component being accessed has not changed, the access is allowed to proceed (step 1006). Otherwise, the method 900 is again performed (step 1008), after which the access request is re-initiated (1010).

Accordingly, aspects of the invention provide a high-level infrastructure (i.e., data repository abstraction components) which isolates the application layer from changes in the data manipulated by the application layer. This infrastructure is also highly configurable, thereby allowing applications to be built iteratively. Further, a given data repository abstraction component is extensible to a plurality of applications, allowing for the building of a family of applications, each reusing the initial investment in the data repository abstraction component. As described with reference to FIG. 10, one embodiment of the invention provides for dynamic instantiation of new data repository abstraction component instances, allowing for on-the-fly changes to be made and for multiple users to dynamically customize their data repository abstraction component. In this manner, users may customize their respective data repository abstraction components according to their particular needs. For example, in a medical environment, cardiologists may require full information about cardiology tests, while neurologists require full information about neurology tests. Applying aspects of the present invention, each user may expose only the information considered relevant to them.

While the foregoing is directed to embodiments of the present invention, other and further embodiments of the invention may be devised without departing from the basic scope thereof, and the scope thereof is determined by the claims that follow.

What is claimed is:

1. A computer-implemented method for providing access to data having a particular physical data representation, comprising:

performing an operation by a computer, the operation comprising;

providing a data repository abstraction based on a plurality of logical fields for defining abstract queries;

providing a first set of mapping rules which map at least a first portion of the plurality of logical fields to a first plurality of physical entities of the data;

providing a second set of mapping rules which map at least a second portion of the plurality logical fields to a second plurality of physical entities of the data;

accessing only the first set of mapping rules for all abstract queries issued by a first user, and accessing only the second set of mapping rules for all abstract queries issued by a second user.

2. The computer-implemented method of claim 1, wherein the abstract query comprises at least one selection criterion and a result specification.

3. The computer-implemented method of claim 1, further comprising transforming each abstract query into a query consistent with the particular physical data representation according to the respective mapping rules.

4. The computer-implemented method of claim 1, where the query consistent with the particular physical data representation s one of a SQL query and an XML query.

5. The computer-implemented method of claim 1, wherein the mapping rules each comprise different access methods for the plurality of logical fields.

6. The computer-implemented method of claim 5, wherein the access methods each describe a location of the physical entities of the data.

7. A computer-implemented method for providing access to data having a particular physical data representation, comprising:

performing an operation by a computer, the operation comprising:

providing a data repository abstraction defining a plurality of logical fields for defining abstract queries; and providing a plurality of user profiles each defining an association with different sets of mapping rules each of which map at least a portion of the plurality of logical fields to physical entities of the data.

8. The computer-implemented method of claim 7, further comprising transforming each abstract query into a query consistent with the particular physical data representation according to the respective mapping rules.

9. The computer-implemented method of claim 7, wherein the mapping rules each comprise different access methods far the plurality of logical fields and wherein the access methods each describe a location of the physical entities of the data.

10. A computer-implemented method of accessing data having a particular physical data representation, comprising:

performing an operation by a computer, the operation comprising;

issuing, by a first user, a first abstract query to an application, wherein the first abstract query is defined according to a first plurality of logical fields;

in response to the first abstract query, accessing a first set of mapping rules having a defined association with the first user;

issuing, by a second user, a second abstract query to the application, wherein the second abstract query is defined according to a second plurality of logical response to the second abstract query, accessing a second set of mapping rules having a defined association with the second user; and transforming each of the first and second abstract queries into queries consistent with the particular physical data representation according to respective mapping rules which map the logical fields to physical entities of the data.

11. The computer-implemented method of claim 10, further comprising, for an initial connection with the application by the first and second users:

(i) selecting the respective set of mapping rules to use for the user;

(ii) setting a level indicator indicative of a manner in which the respective set of mapping rules were selected for the particular user accessing the mapping rules; and (iii) loading the selected mapping rule set.

12. The computer-implemented method of claim 11, wherein selecting the set of mapping rules to use for the user comprises determining whether a predefined association between the user and a particular mapping rule set exists;

if so, selecting the particular mapping rule set as the set of mapping rules to be accessed for queries issued by the user; and if not, selecting a default mapping rule set as the set of mapping rules to be accessed for queries issued by the user.

13. The computer-implemented method of claim 11, further comprising, for each access of the respective set of mapping rules by the first and second users:

determining the level indicator of the set of mapping rules being accessed;

for at least a first level indicator, determining whether the set of mapping rules being accessed has changed relative to when the mapping rules set being accessed was loaded for the user, and if so, performing steps (i)–(iii); and for at least a second level indicator, determining whether another level exists for the user, and if so, performing steps (i)–(iii).

14. The computer-implemented method of claim 13, wherein the first level indicator is a user level indicator indicating that the set of mapping rules being accessed by the respective user has a defined association with the user and wherein the second level indicator is at least one of: (i) a group level indicator indicating that the set of mapping rules being accessed by the respective user has a defined association with a group of which the user is member; and (ii) an application level indicator indicating that the set of mapping rules being accessed by the respective user is a default set of mapping rules.

15. The computer-implemented method of claim 10, wherein the mapping rules each comprise at least one access method for each logical field of the abstract query.

16. The computer-implemented method of claim 15, wherein the access methods each describe a physical location of a physical entity of the data.

17. A computer program product for use in a computer system, comprising:

a computer-readable medium containing computer-readable program code for a database access environment which provides access to data having a particular physical data representation, the database access environment comprising:

a data repository abstraction defining:
- a plurality of logical fields for defining abstract queries; and
- a plurality of mapping rules sets which map the plurality of logical fields to physical entitles of the data, and wherein at least two of the plurality of mapping rules sets map the plurality of logical fields to different sets of the physical entitles of the data and are uniquely associated with at least one of two different requesting entities selected from one of two different users, two different groups of users, and a group of users and a user.

18. The computer program product of claim 17, further comprising computer-readable program code for a runtime component which transforms an abstract query issued by one of the two different requesting entities, and defined according to the data repository abstraction, into a query consistent with the particular physical data representation according to the respective mapping rules of the two different requesting entitles.

19. The computer program product of claim 17, wherein the mapping rules comprise at least one access method for each of the plurality of logical fields.

20. The computer program product of claim 19, wherein the access method describes a location of the physical entitles of the data.

21. A computer-readable medium containing a program which, when executed by a processor, performs an operation of accessing data having a particular physical data representation, the operation comprising:

receiving a plurality of abstract queries from different users, wherein each respective abstract query from a respective user is composed on the basis of a respective data repository abstraction component for the respective user, each data repository abstraction component comprising a plurality of logical fields that map to physical entities of the data; and transforming the respective abstract query into a query consistent with the particular physical data representation according to the respective data repository abstraction component for the respective user; wherein different data repository abstraction components are associated with at least two of the users.

22. The computer-readable medium of claim 21, wherein the mapping rules comprise an access method for each logical field of the abstract query.

23. The computer-readable medium of claim 22, wherein the access method describes a physical location of the physical entities of the data.

24. A computer, comprising:

a memory containing at least (i) an application defining a query specification providing an interface to data repository abstraction components which provide a definition for an abstract query according to logical fields, (ii) a plurality of data repository abstraction components which map the logical fields to physical entities of data, wherein at least a portion of the data repository abstraction components have a programmatically defined association with different users, and (iii) a runtime component for transforming the abstract query into a query consistent with the physical entities of data according to the data repository abstraction components, wherein a first data repository abstraction component is utilized for transforming a first plurality of abstract queries from a first user and a second data repository abstraction component is utilized for transforming a second plurality of abstract queries from a second user; and a processor adapted to execute contents of the memory.

25. The computer of claim 24, wherein the data repository abstraction components comprise an access method for each of the plurality of logical fields.

26. The computer of claim 24, further comprising a storage device containing the data.

27. The computer of claim 26, wherein the access method describes a location of the physical entitles of the data.

* * * * *

UNITED STATES PATENT AND TRADEMARK OFFICE
CERTIFICATE OF CORRECTION

PATENT NO. : 6,928,431 B2
DATED : August 9, 2005
INVENTOR(S) : Richard Dean Dettinger et al.

It is certified that error appears in the above-identified patent and that said Letters Patent is hereby corrected as shown below:

<u>Column 19,</u>
Line 16, after "plurality" insert -- of --;
Line 30, "s" should be -- is --;
Line 55, "far" should be -- for --.

Signed and Sealed this

Eighteenth Day of October, 2005

JON W. DUDAS
*Director of the United States Patent and Trademark Office*